United States Patent [19]

Kuroi et al.

[11] 4,158,792
[45] Jun. 19, 1979

[54] LIGHT CONTROL DEVICE FOR HIGH FREQUENCY LIGHTED FLUORESCENT LAMP

[75] Inventors: Hisashi Kuroi, Kyoto; Masamichi Hatada, Uji; Kumio Morita, Komatsu; Eiji Tanaka, Kyoto, all of Japan

[73] Assignee: Kuroi Kosan Kabushiki Kaisha, Kyoto, Japan

[21] Appl. No.: 842,338

[22] Filed: Oct. 14, 1977

[30] Foreign Application Priority Data

Oct. 15, 1976 [JP] Japan .................................. 51-124024

[51] Int. Cl.² ...................... H05B 37/00; H05B 41/29
[52] U.S. Cl. ........................................ 315/86; 315/96; 315/99; 315/DIG. 2; 315/DIG. 5; 315/DIG. 7
[58] Field of Search ............... 315/99, 96, 86, DIG. 2, 315/DIG. 5, DIG. 7

[56] References Cited

PUBLICATIONS

W. Elenbass, High Pressure Mercury Vapour Lamps & Their Applications, Philips Technical Library, 1965, pp. 98–100.
W. Elenbass & T. Hehenkamp, "A New Fluorescent Lamp in a Starterless Circuit", Philips Technical Review, vol. 17, No. 10, Apr. 1956, pp. 288–293.
P. D. Parker, "A Review of the Developments of Ballasts & Circuits for Operating Discharge Lamps", Lighting Research and Technology, vol. 1, No. 4, 1969, pp. 199–234.
IES Lighting Handbook, 5th edition, Illuminating Engineering Society, 1972, pp. 8-32 & 8-120.

Primary Examiner—Alfred E. Smith
Assistant Examiner—Charles F. Roberts
Attorney, Agent, or Firm—Raphael Semmes

[57] ABSTRACT

A light control device for a high frequency lighted fluorescent lamp includes a high frequency variable voltage power source. A first impedance element (a capacitor and inductor in series) is provided between the terminals of the lamp on the side opposite to the power source. A second impedance element (an inductor) is connected between the power source and the terminals of the lamp, and a third impedance element (a capacitor) is connected across the lamp on the power source side. A constant power source circuit supplies, upon starting of the lamp, constant power to the first impedance element to thereby apply substantially constant cathode pre-heating current and starting voltage and applies, during the lighting of the lamp, substantially constant cathode heating current. The control circuit is capable of pre-set light control. The light control device suppresses beat interference and fluorescent lamp noises due to the electric field radiated from the lamp. Rapid and instant starting is enabled. The solid state ballast is suitable for fluorescent lamp appliances for domestic use and permits use as an emergency lamp.

13 Claims, 22 Drawing Figures

FIXED FREQUENCY- SINE WAVE- DC INPUT PROPORTIONAL AMPLITUDE INVERTER WITH BUILT-IN RECTIFIER FILTER CIRCUIT BY MEANS OF A DIODE BRIDGE

LIGHT CONTROL DEVICE FOR HIGH FREQUENCY LIGHTED FLUORESCENT LAMP

BACKGROUND OF THE INVENTION

It is generally said of solid state ballasts in high frequency lighting that they provide the advantages of reduction in weight and size, improvement in the luminous efficiency of radiation, compatability both to 60 Hz and 50 Hz, and removal of flickers and ballast noises and the likes. With regard to ballasts for domestic use, as distinguished from those for business use (office, workshop, etc), however, it is considered that such advantages are still insufficient; the essential advantage of domestic high frequency lighting resides rather in that the use of a plurality of miniature components is enabled by RF lighting (for example, 20 KHz), which increases the degree of freedom in circuit design. The inherent features of a solid state ballast for domestic use in high frequency lighting can be considered, plainly, as the introduction of the simplicity and convenience of an incandescent lamp as much as possible while retaining the merits of a fluorescent lamp. Basic functions necessary for realizing the above features include:
 (i) provision of versatile and flexible functions as a ballast circuit for fluorescent lamp;
 (ii) elimination of waveform interference, in particular, radio wave interference accompanying high frequency operation, as well as retention of lamp compatibility with regard to the use of a pre-heat start type fluorescent lamp; and
 (iii) fail-safe and fool-proof functions necessary for keeping high reliability and the like.

Among the above, the functions (iii) are additional circuit function; and these have only to be noted to attain them in a simple construction. On the contrary, special skill is required to satisfy both of the functions (i) and (ii) in combination, which is the object of the present invention.

SUMMARY OF THE INVENTION

According to the present invention, it is possible to attain various functions as described below while maintaining effective suppression of beat interference and fluorescent lamp noises caused by the electric field radiated from a fluorescent lamp in high frequency operation, as well as the possibility of using a pre-heat start type fluorescent lamp:
 (a) light control for a fluorescent lamp by way of an entire 2-line system (generally a 3-line system), a common light control for a plurality of fluorescent lamp appliances and thus an applicability to indirect lighting or the like, pre-set light control and a stepwise light control for pendant appliances by the use of a simple exclusive switch;
 (b) rapid starting and practically instant starting, if required, by reducing the required starting time;
 (c) operation for a multiplicity of lamps, which is an essential function in view of cost and simplicity for lighting appliances, both for a plurality of appliances of a same kind and for a plurality of appliances of different kinds.

In addition, according to the present invention, recessed light control devices can be made simple and compact just as those used for incandescent lamps. Moreover, radio wave interference, which is significant in conventional light control devices for fluorescent lamp due to their operational principle, can be decreased markedly by the present invention. Accordingly, the present invention makes possible the practical use of a fluorescent lamp light control device for domestic use just as in the light control for incandescent lamps, and permits multi-lamp operation which is indispensable to the compact arrangement of lighting appliances. It also makes possible, for starting, rapid starting or even instantaneous starting from a practical point of view. While the luminous efficiency in high frequency lighting is improved by about 20% when measured actually for a circular line lamp with, therefore, an expected saving of about 20% of the power consumption, this is only an additional advantage; the primary objects of the present invention are, it is to be understood, to increase the degree of the freedom as to the ballast and the use of a fluorescent lamp control in the same manner as in an incandescent lamp.

To these ends, a light control device, according to the invention, includes a high frequency variable voltage power source. A first impedance element (a first capacitor and a first inductor in series) connects the lamp terminals on the side opposite to the power source. A second impedance element (a second inductor having mutual inductance with the first inductor) is connected between the power source and a terminal of the lamp. A third impedance element (a second capacitor) is connected between the lamp terminals on the power source side. A constant power source circuit supplies, upon starting of the lamp, constant power to the first impedance element to thereby apply substantially constant cathode pre-heating current and starting voltage and applies, during the lighting of the lamp, substantially constant cathode heating current. The voltage source is provided in several embodiments. In one, a variable output AC-DC converter feeds a fixed frequency - sine wave - DC input proportional amplitude inverter. In a second, a rectifier and filter circuit feeds a fixed frequency - sine wave - variable amplitude output inverter. The AC-DC converter may include a triac control on the AC side, SCR control on the DC side, or an SCR rectifier bridge. A plurality of lamps may be operated in parallel from the variable amplitude AC-DC converter, each lamp having its own fixed frequency - sine wave - DC input proportional amplitude inverter with a built-in rectifier filter circuit using a diode bridge. An emergency lamp embodiment operates from sensor controlled DC power sources. Another embodiment uses a built-in DC power source.

DETAILED DESCRIPTION OF THE INVENTION

The present invention relates to a light control device for high frequency lighted fluorescent lamp which permits pre-set light control by the use of a constant power circuit for the input of a high frequency variable power source voltage.

It is generally required for a solid state ballast for domestic use to satify both of the severe performances requirement such as suppression of R.F. interference, compatability with a pre-heat start type fluorescent lamp or the like, and versatility of functions such as rapid starting, capability of light control or the like. The functions or performances requirements to be satisfied simultaneously are simple, in a sense, for high output discharge type lamps, for example, of several hundred watts, but they are rather complicated in lamps for domestic use.

The present invention provides a light control device for high frequency lighted fluorescent lamp for domestic use, for example, which can satisfy both the foregoing severe requirements for performance and the versatility of the functions; and the invention will now be described in detail by way of preferred embodiments thereof referring to the accompanying drawings.

Figure 1:
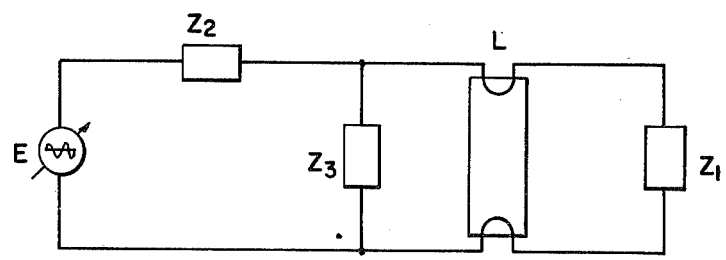
FIG. 1 is a circuit diagram of one embodiment of a light control device for a high frequency lighted fluorescent lamp according to the present invention.

In FIG. 1, there are shown a high frequency variable voltage power source E, a fluorescent lamp L, a first impedance element $Z_1$ connected to terminals of the fluorescent lamp L on the side opposed to the power source E, a second impedance element $Z_2$ connected in series between the power source E and the power source terminal of the fluorescent lamp L and a third impedance element $Z_3$ connected in parallel with the power source terminals of the fluorescent lamp L. The circuit shown constitutes a constant power circuit for supplying constant power to the first impedance element $Z_1$ at the time of starting.

Since lamp voltage $E_l$ for the fluorescent lamp L is substantially constant during lighting of the lamp in the circuit, a cathode heating current Ir necessary in light control can be represented as:

$$Ir = (E_l/Z_1) \simeq \text{constant}$$

As the lamp current Id flows in proportion to the power source voltage E, light control is enabled by the change and setting of the high frequency power source voltage.

Upon starting, a pre-set light control is made possible by forming a constant power circuit with the second impedance element $Z_2$ and the first and third impedance elements $Z_1$ and $Z_3$ and applying a substantially constant power to the first impedance element $Z_1$ to thereby render both of the cathode pre-heat current Ipre and the starting voltage Est substantially constant.

The constant power circuit can also be formed with the second impedance element $Z_2$ and the first impedance element $Z_1$.

Figure 2:
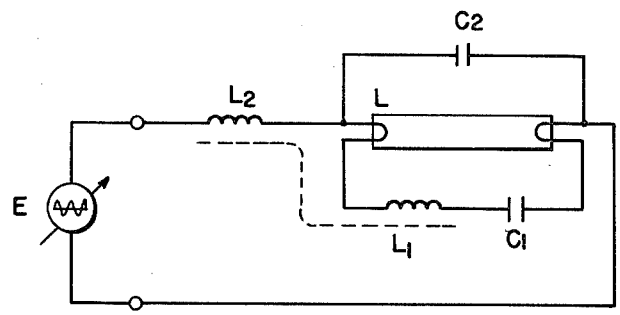
FIG. 2 and FIG. 4 are more detailed circuit diagrams of the embodiment shown in FIG. 1.
Figure 3:
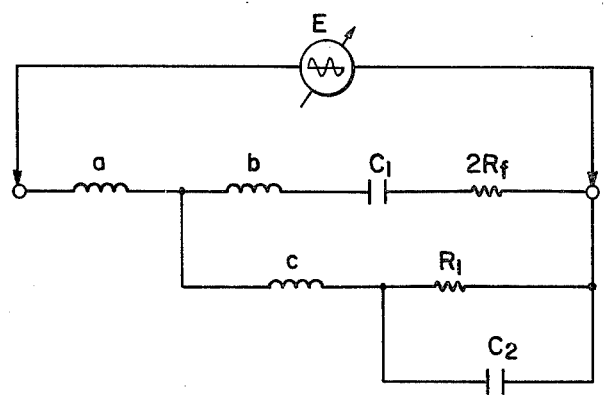
FIG. 3 and FIG. 5 are equivalent circuit diagrams for the circuits shown in FIG. 2 and FIG. 4.
Figure 4:
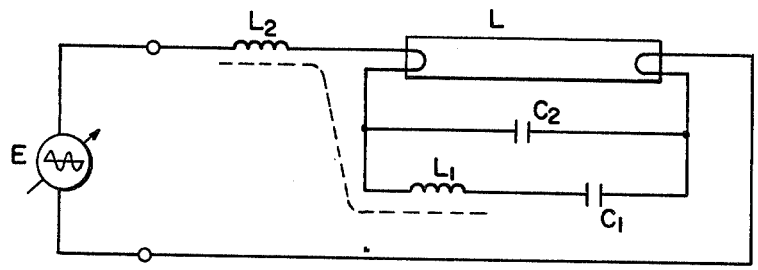
Figure 5:
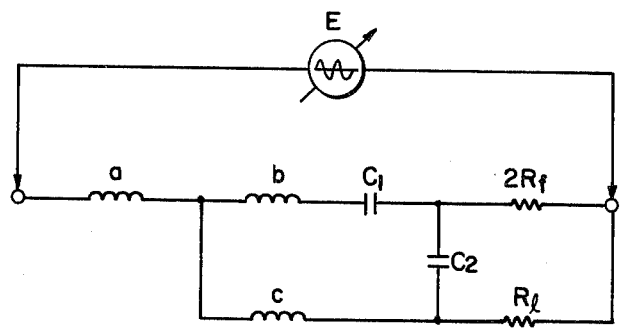

FIG. 2 shows a detailed embodiment of the circuit shown in FIG. 1 in which a serial circuit of a first coil $L_1$ and a first capacitor $C_1$ are used as a first impedance element $Z_1$, a second coil $L_2$ provided in a magnetic circuit in common to the first coil $L_1$ is used as the second impedance element $Z_2$ and a second capacitor $C_2$ is used as the third impedance element $Z_3$. FIG. 3 shows an equivalent circuit for the circuit in FIG. 2 and FIG. 4 shows another embodiment comprising the first and second impedances $Z_1$ and $Z_2$ wherein the third impedance $Z_3$ and the first impedance $Z_1$ are synthesized by connecting the capacitor 2 to the lamp L on the opposed side of the power source. FIG. 5 shows an equivalent circuit for the circuit in FIG. 4 wherein $R_l$ is an equivalent lamp resistance which gives effective values for lamp current and lamp voltage, Rf is a filament resistance and the inductance values of coils, a, b and c are $L_1 + M$, $L_2 + M$ and $-M$ respective when the mutual inductance M between the first and the second coils $L_1$ and $L_2$ is of an additive polarity and $L_1 - M$, $L_2 - M$ and $+M$ respetively when M is of a subtractive polarity.

Reference will now be made to various effects of the above circuit successively.

(1) Effective Suppression of Radio Wave Interference

Figure 6:
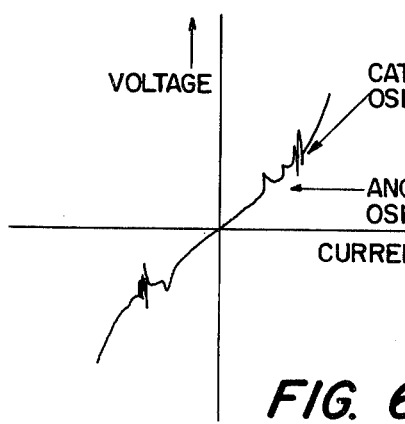
FIG. 6 is a graph showing voltage-current characteristics in a standard fluorescent lamp upon high frequency lighting.
Figure 7:
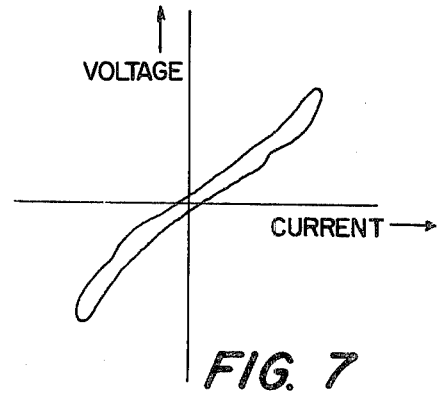
FIG. 7 is a graph showing voltage-current characteristics of a fluorescent lamp in the circuits shown in FIG. 2 and FIG. 4.

Harmonic waves derived from the power source owing to the non-linearity of the voltage-current characteristics of the lamp L at high frequency lighting as shown in FIG. 6 and those introduced due to the distortion of the power source are filtered off through a low pass filter composed of the second coil $L_2$ and the second capacitor $C_2$ with respect to the equivalent resistance $R_l$ of the lamp L. The harmonic waves thus filtered off through the above filter are attenuated to a level about 40 dB lower than that attained with the filter used in a conventional light control device. A desired function is thus provided to the circuit in that the lighting circuit per se constitutes a high performance filter. Besides, the by-pass second capacitor $C_2$ effectively acts on the anode and the cathode oscillations which result in so-called fluorescent lamp noises as shown in FIG. 7 to suppress the same.

(2) Rapid Starting for a Pre-heat Start Type Fluorescent Lamp

Since a pre-heat start type fluorescent lamp is adapted to operate from a power source by way of high impedance, no satisfactory interchangeability can be expected in the rapid starting using cathode heating coils. It is conventional, in a rapid starting circuit for use with commercial frequency, to minimize a magnetic circuit by using generally low cathode heating current and low starting voltage and a trade-off therefor is the use of an exclusive tube or an exclusive auxiliary starting device.

To attain a satisfactory interchangeability in the rapid starting using a pre-heat start type flurorescent lamp, it is desired to supply a sufficient cathode heating current by means of current source driving and apply a sufficient starting voltage.

In high frequency starting, the degree of freedom in the circuit can be increased to facilitate the use of such means and the following relation is present among the starting voltage Vst, lamp voltage $V_l$, pre-heating current Ipre and the residual cathode current Ir during lighting in the circuit of the present invention where the equivalent lamp resistance $R = \infty$ and the mutual inductance $X_M$ between the first coil $L_1$ and the second coil $L_2$ is much lower than the reactance $X_{C2}$ of the second capacitor:

$$(Est/E_l) \simeq Ipre/Ir$$

In the above relation, $Est/E_l$ or Ipre/Ir can be set to a value, for example, 3 or 6 since there are some degrees of freedom in the power source voltage E and, consequently, sufficient pre-heating current Ipre and starting voltage Est can be supplied. Moreover, the starting voltage source in this circuit is much more powerful to ensure more reliable starting than a solid state starter and there are no problems in the re-operation of the starter. The circuit is considered to have an interchangeability also with a rapid starting tube of the same rating. While the circuit of the present invention thus takes a best situation for obtaining the interchangeability as it is, the sufficient interchangeability is further improved by increasing the capacity of an inverter. One of the methods for attaining the above purpose involves setting a continuous capacity as low as possible by the use of a suitable protector which conducts the starting operation not at a continuous rating but at a rate for a brief period.

(3) Light Controllability

For light control at high frequency lighting, it is, of course undesired to control the angle of conduction as in commercial frequency lighting in view of radio wave interference. Adoption of variable impedance, that is, variable frquency is also undesirable, since it results in waveform distortion and reduces the inverter efficiency. This is so, because the operation of the inverter cannot be maintained at its optimum point. Moreover, change of the operation frequency up to the range of 2-3 times for controlling the amount of light from the whole level to $\frac{1}{2}$-$\frac{1}{3}$ level brings about a difficulty in the balance between ultrasonic frequency operation and control of radio wave interference. Referring to the change of the inductance as another means for changing impedance, mechanical changing means cannot be employed at all; and it was found also undesired as the result of a simple experiment to change the inductance by superimposing a direct bias current in view of the radio wave interference referring to the non-linear operation during lighting. Consequently, it is considered that a suitable means for performing light control without resulting waveform interference (radio wave interference) in high frequency lighting is the used of a variable input voltage at a fixed frequency. Apart from the fact that the high frequency power source voltage E and the lamp current Id are inherently kept in a proportional relation, sufficient supply of the cathode heating current required for the light control of a hot cathode fluorescent lamp (usually maintained at a constant level by a heater transformer) and a practically desired preset light control, i.e., self starting hot by cold starting even under the reduced light condition, are enabled in the circuit of the present invention as described below.

Supplement of the remaining current Ir at substantially a constant level during lighting is made possible by the property of a discharge tube by virtue of which the lamp voltage shows no significant changes with significant changes in the lamp current; and the level of the remaining current can be set at a predetermined level, since a high degree of freedom is present for the selection of the preheating current Ipre, the remaining current Ir and the starting voltage Est. While the lamp voltage somewhat increases with the decrease in the lamp current, it is rather preferred since it means a slight increase in the remaining current Ir. Since the pre-heating current Ipre and the starting voltage Est are generally in a proportional relation in this circuit, and they can be considered to compensate each other with respect to the cathode consumption at the starting, it is concluded that satisfactory starting characteristics can be maintained if the changes in the starting voltage Est, in other words, in the pre-heating current Ipre, can be kept substantially constant against the changes in the power source voltage E. Since the circuit is a sort of composite resonance circuit, the pre-heating current Ipre and the starting voltage Est can be kept at a substantially constant level by suppressing the changes in the pre-heating current Ipre and the starting voltage Est by way of a so-called constant power circuit which is formed through the saturation of the inductor in an advanced phase circuit composed of the first capacitor $C_1$ and te first coil $L_1$ in a series connection where the power source voltage E is high, and by supplementing their levels, boosting them through the resonance between the second coil $L_2$ and the second capacitor $C_2$ where the power source voltage E is low. In the case of an inductor of additive polarity, its saturatable operation at starting and non-saturation operation during lighting are used respectively according to a great difference between the magnetomotive forces at starting and during lighting, the former being, for example, three times as high as the latter.

Figure 8:
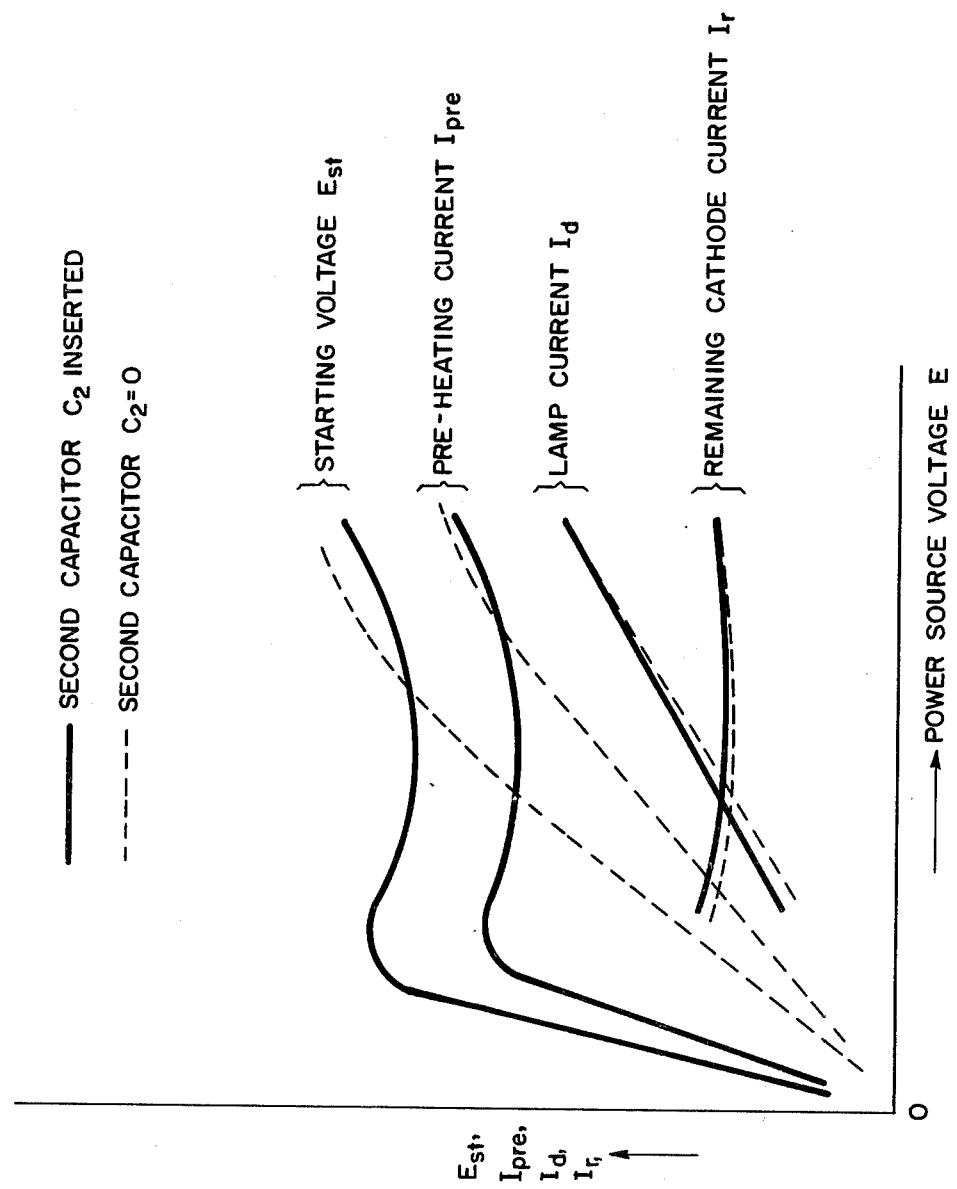
FIG. 8 and FIG. 9 are graphs showing characteristics of various factors against a power source voltage where a ferrite core is used in a magnetic circuit, the impedance is designed as that of additive polarity, and a standard high frequency power source and a dummy load are used.
Figure 9:
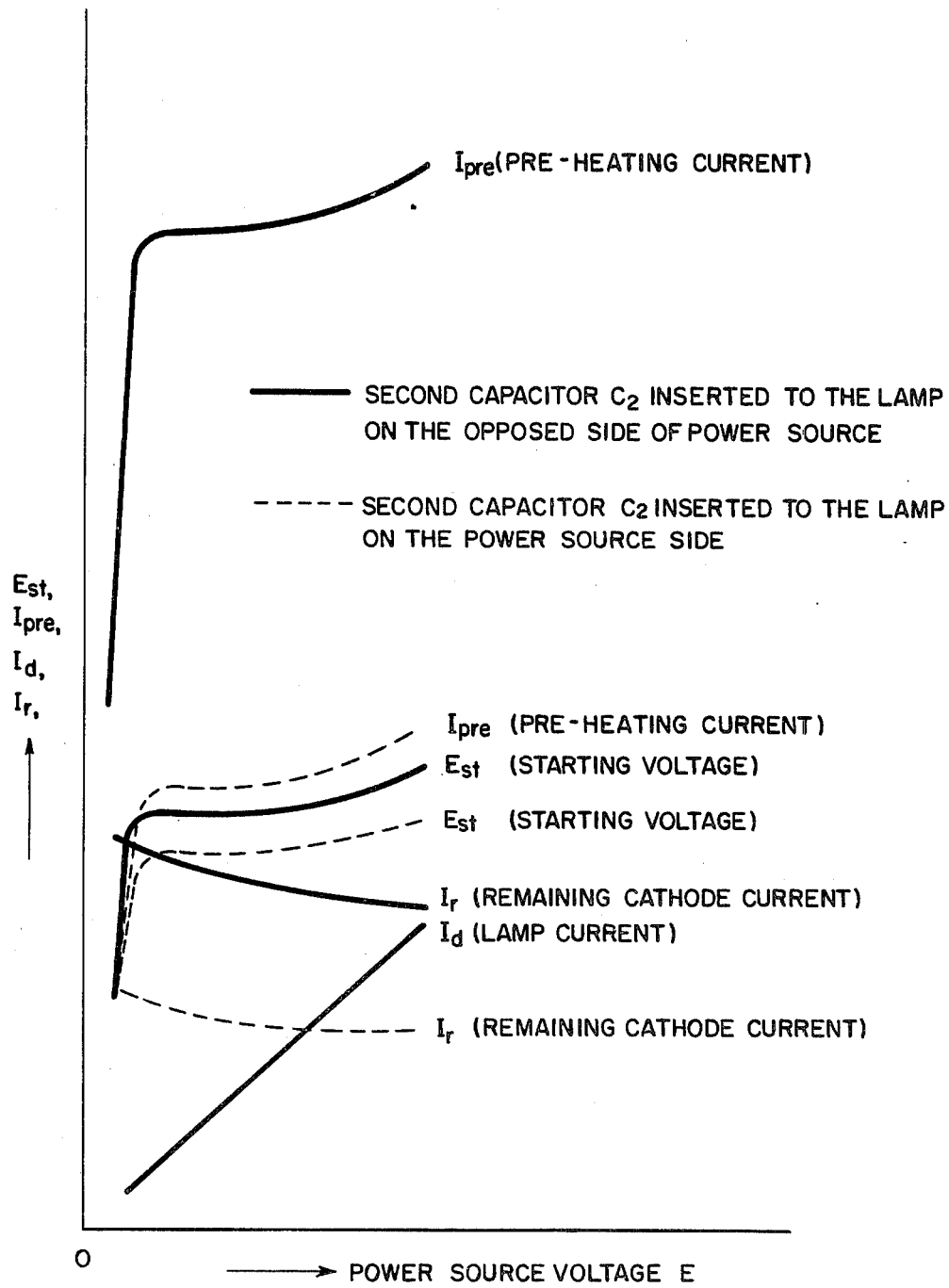

FIG. 8 and FIG. 9 show the characteristics of starting voltage Est, pre-heating current Ipre, lamp current Id and remaining cathode current Ir against power source voltage E where a ferrite core is used in a magnetic circuit, the mutual inductance is made as of additive polarity and a standard high frequency power source and a dummy load are employed. FIG. 8 shows an effect of a second capacitor $C_2$ in a by-pass circuit on the starting characteristics. Also as shown in FIG. 9, the remaining cathode current Ir increases in the circuit shown in FIG. 4 wherein the by-pass current of the second capacitor $C_2$ flows to the lamp electrodes, which is advantageous where the remaining cathode current is selected to a slightly higher level, as well as enabling a practical instant starting not in cold start by pre-heating the cathode instantaneously on every steep increase in the cathode pre-heating current Ipre. This not only provides a significant reduction in the time required for starting but also decreases greatly the cathode consumption at starting, enabling the starting voltage Est to be set at a higher level to thereby ensure more reliable lamp starting and further improve the interchangeability of the lamp. The steep increase in the pre-heating current Ipre in the circuit shown in FIG. 4 is due to the following resons:

In the equivalent circuit shown in FIG. 5, the reactance Xc of C in additive polarity is represented as:

$$Xc = j\omega(-M),$$

which is equivalent to the reactance of an equivalent capacitor Ceq:

$$\frac{1}{j\omega C_{eq}} = \frac{-j}{jC_{eq}} = -j\omega M$$

$$\therefore C_{eq} = \frac{1}{\omega^2 M} = \frac{1}{\omega^2 \sqrt{L_1 L_2}}$$

At starting, the inductances of $L_1$ and $L_2$ are decreased through saturation and hence and reactance Ceq is increased to increase the current distributed to the second capacitor $C_2$ since the reactance Ceq is serially inserted to the main circuit composed of the lamp resistance $R_l$ and the second capacitor $C_2$. The above trend becomes conspicuous as the capacitance of the second capacitor $C_2$ is selected to a higher value than that of the first capacitor $C_1$.

(4) Increased Life

As the lamp current Id is increased in this circuit, double spots are formed which are based on the remaining cathode (heating) current Ir advanced in phase by 90° with respect to the lamp current and are judged to form a high output lighting circuit or a long life circuit although imperfect due to the single pin power supply. It is, however, inappropriate to apply the circuit of the present invention to high output lighting in which the luminous efficiency is reduced, because of the imperfect balance due to single-pin feeding or the like. It may be more advantageous to employ the circuit in a system, where a number of parts are used and current values tend to vary, for accommodating such defects, because a slight increase in the lamp current results in no particular problem in life.

(5) Simplicity

The present circuit can be simple in structure in view of its functions. Since no leaking magnetic flux path or the like is required in the magnetic circuit, the circuit may be of such a structure as to provide a coupling coefficient of about 1 and the circuit elements comprise only one core, two coils and two capacitors. It is also advantageous that the resonance with the second bypass capacitor $C_2$ is obtained at a less saturated area of the inductance characteristic, enabling a high accuracy to be maintained with ease.

Figure 10:
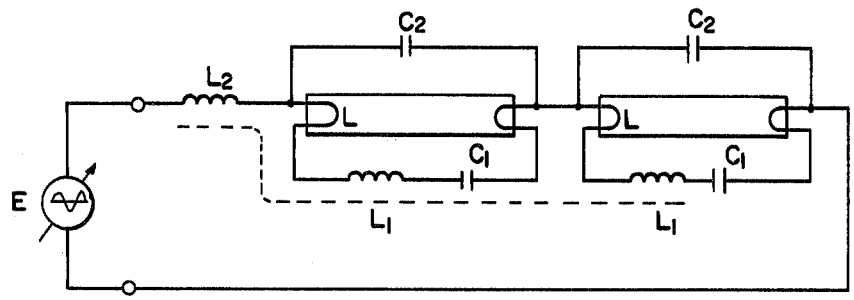
FIG. 10 and FIG. 11 are circuit diagrams of embodiments for sequential operation.
Figure 11:
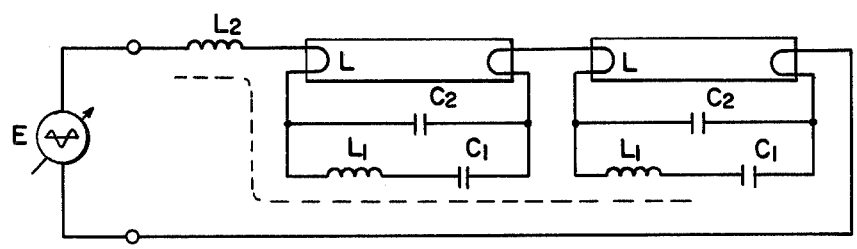

The high frequency lighted devices shown in FIG. 10 and FIG. 11 make possible the simplification of the magnetic circuit in the application to two-fluorescent tube appliances used frequentely. FIG. 10 shows a circuit where the second capacitor $C_2$ is provided on the power source side, and FIG. 11 shows a circuit where the capacitor $C_2$ is provided on the side opposite to the power source. Either of the circuits shown performs a sequential operation while using the second coil in common to the two tubes.

According to the light control device of the present invention for a high frequency lighted fluorescent lamp, as in the foregoings, the cathode, pre-heating current, which is at a substantially constant level or at a significantly increased level, and the starting voltage are applied to the input of the high frequency variable power source voltage by forming a constant power circuit with the first impedance element at starting; and substantially constant cathode heating current is applied by way of the lamp voltage during lighting, enabling preset light control, as well as providing various effects such as effective suppression of radio wave interference, rapid starting or instant starting of a pre-heating start type fluorescent lamp, light controllability, long life, simplicity and the like.

The light control device for a high frequency lighted fluorescent lamp according to the present invention is applicable to various uses depending on the construction of the high frequency variable voltage source E.

Figure 12:
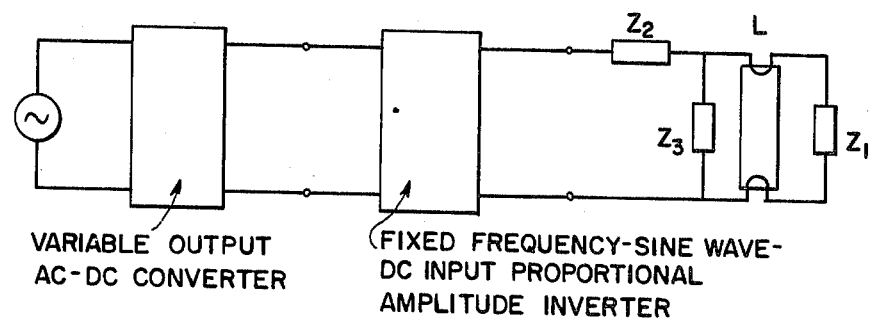
FIG. 12 and FIG. 13 show basic construction of variable voltage high frequency power sources.
Figure 13:
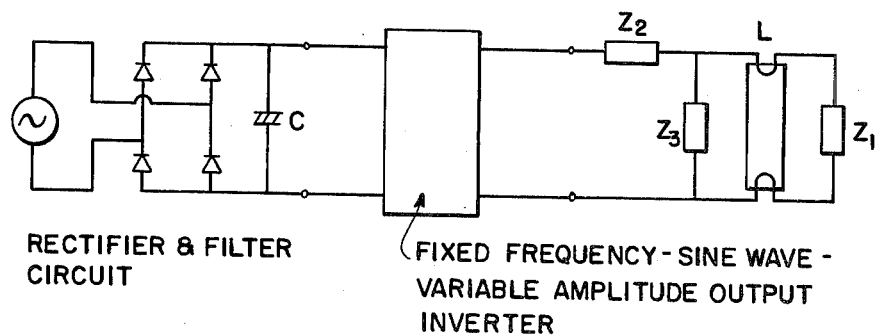

The system shown in FIG. 12, wherein a high frequency variable voltage power source E is composed of a variable output AC-DC converter and a fixed frequency - sine wave - input proportional amplitude inverter, permits the provision of a light control circuit for fluorescent lamp in a complete 2-line system, since the AC-DC converter corresponding to the light controller has a two line output and the fluorescent lamp control device circuit has two-wire input from the inverter. The fluorescent lamp lighting circuit to be loaded on the inverter shown in FIG. 12 is suited to the assembly of fluorescent lamp appliances for domestic use, since a plurality of lighting circuits for lamps of a same kind or different kinds can be connected thereto in parallel. The system shown in FIG. 13, wherein a high frequency variable voltage power source comprises a circuit for the direct rectification and filtration of a commercial power source and a fixed frequency - sine wave - variable output inverter, is suited to the assembly of a pendant type fluorescent lamp appliances with a stepwise light control system for domestic use which operates, for example, by switching the ratings of the LC resonance circuit on the output of a fixed frequency separately excited inverter by an appropriate pull-switch.

Figure 17:
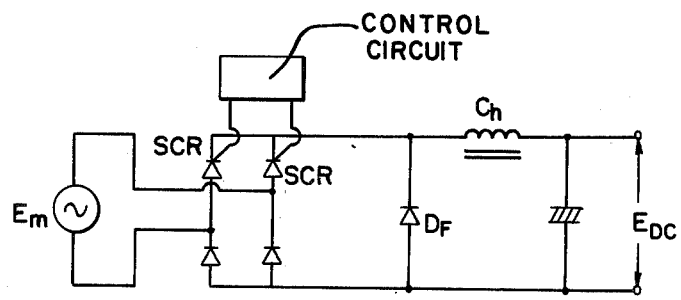
FIG. 17 is a circuit diagram for a well-known controlled rectifier.

Various systems are already known for the circuit shown in FIG. 12 which functions as a variable output AC-DC converter, apart from the problems of their sizes and complexity. Among them, a much simplified system employing thyristors, as shown in FIG. 17, uses a fly-wheel diode $D_F$ and a choke coil Ch of a enough capacity. By setting the triggering phase $\alpha$ as: $0 < \alpha < \pi$ and the angle of conduction as up to $\pi$, the following relation is obtained:

$$E_{DC} = \frac{1}{\pi} \int_{\alpha}^{\alpha + \pi} \sqrt{2}\, E_m \sin d\alpha = \frac{\sqrt{2}\, E_m}{\pi}(1 + \cos \alpha)$$

Accordingly, the output voltage reaches its maximum at $\alpha = 0 : E_{DC} = 0.9\, E_m$ and minimum at $\alpha = \pi : E_{DC} = 0$. The conduction state of the thyristors from the triggering phase $\alpha$ to the phase $\pi$ can be kept by an inductor large enough not to reduce the choke current to zero, and the thyristors are set to open at the phase $\pi$ by the fly-wheel diode. The output is filtered through the choke coil and the capacitor to provide a DC output voltage $E_{DC}$ as the mean value thereof. The circuit is, however, not suited practically to a recessed type appliance since the DC output voltage $E_{DC}$ is also at $0.9\, E_m$ when $\alpha = 0$ and does not correspond with the value of $E_{DC}$ at $1.4\, E_m$ obtained through the use of direct rectification and filtration from a commercial power source, among other things, because of the large volume of the choke coil.

Figure 14:
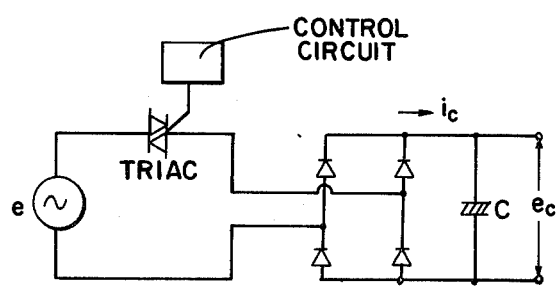
FIG. 14 and FIG. 15 are circuit diagrams of AC-DC converters each employing thyristors.
Figure 15:
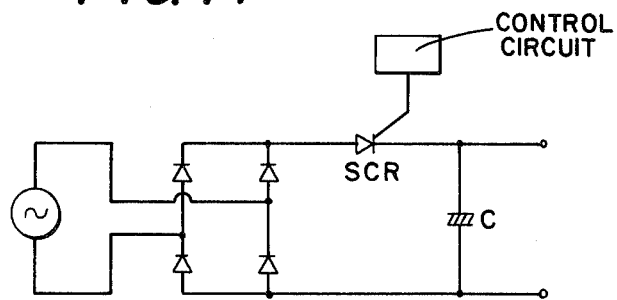
Figure 16:
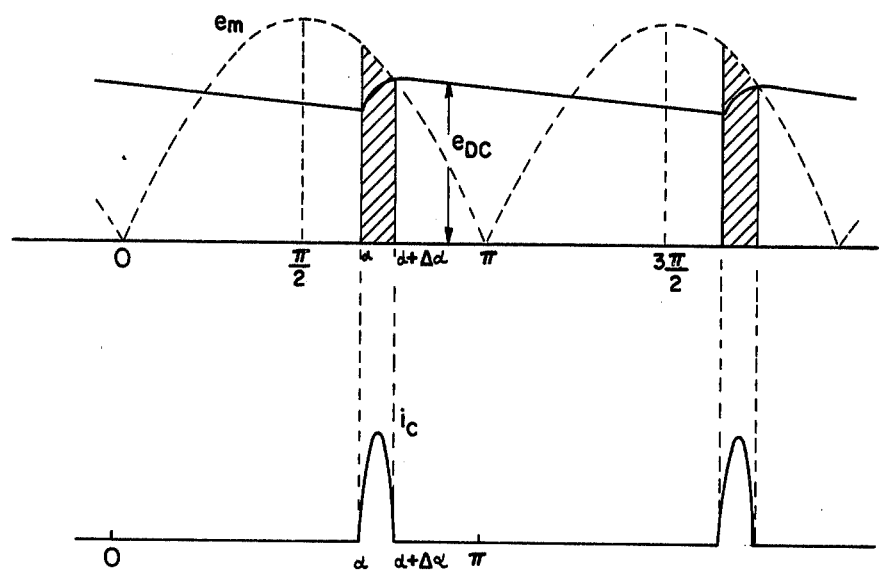
FIG. 16 is an explanatory chart for the operation of the above converters.

While, on the other hand, in the variable output AC-DC converter according to the present invention whose circuits are shown in FIG. 14 and FIG. 15 and whose operation is shown in FIG. 16, the conduction state of the thyristors from the triggering phase $\alpha$ to the phase $\alpha+\Delta\alpha$ is performed with the charging current $i_c$ to a capacitor C; and the following relation is given at the completion of the charging:

$$e_m(\alpha+\Delta\alpha)-e_m(\alpha)<0$$

$$\therefore \pi/2<\alpha<\pi$$

Opening of the thyristors are thereby ensured, and the DC output voltage $E_{DC}$ from the capacitor C is given substantially as the instantaneous value of the power source voltage at the opening of the thyristor as: $e_m(\alpha+\Delta\alpha)$. Consequently, $$E_{DC}\simeq\sqrt{2}\ E_m \sin(\alpha+\Delta\alpha),\ \pi/2\leq\alpha\leq\pi,\ \Delta\alpha\leq\leq$$

The output voltage reaches its maximum at $\alpha+\Delta\alpha=\pi/2$ as: $E_{DC}\simeq\sqrt{2}\ E_m$, and the outvoltage is minimal at $\alpha+\Delta\alpha=\pi$ as: $E_{DC}\simeq 0$ Since considerable ripple contents is allowed in the fluorescent lamp light control circuit, in particular, for domestic use which requires no extreme lower limit for the light control, a simple and compact variable output AC-DC converter, that is, a light control device can be obtained with the foregoing construction. As well, load wiring through a 2-line non-polarity connection is permitted as described later.

It also is convenient from a practical standpoint that the converter can be handled primarily as an option where the converter is not connected, but the commercial power source is directly rectified and filtered, since the rectified output corresponds to the max output $\sqrt{2}\ E_m$ from the converter. Moreover, where the converter is always used in combination, it can be used with any of the commercial power sources of different voltages, such as 100, 117 and 200 V, by merely adjusting the triggering point of the thyristor corresponding thereto. Selection of the angle of conduction $\Delta\alpha$, in other words, suppression of a peak value $i_c$ and the suppresion of spreading of the frequency spectrum of $i_c$ for the prevention of line noises, can be attained effectively through the LC resonance obtained by inserting an inductor of a small capacity in series with the thyristor, since C is of the order of about several hundreds $\mu F$.

Figure 18:
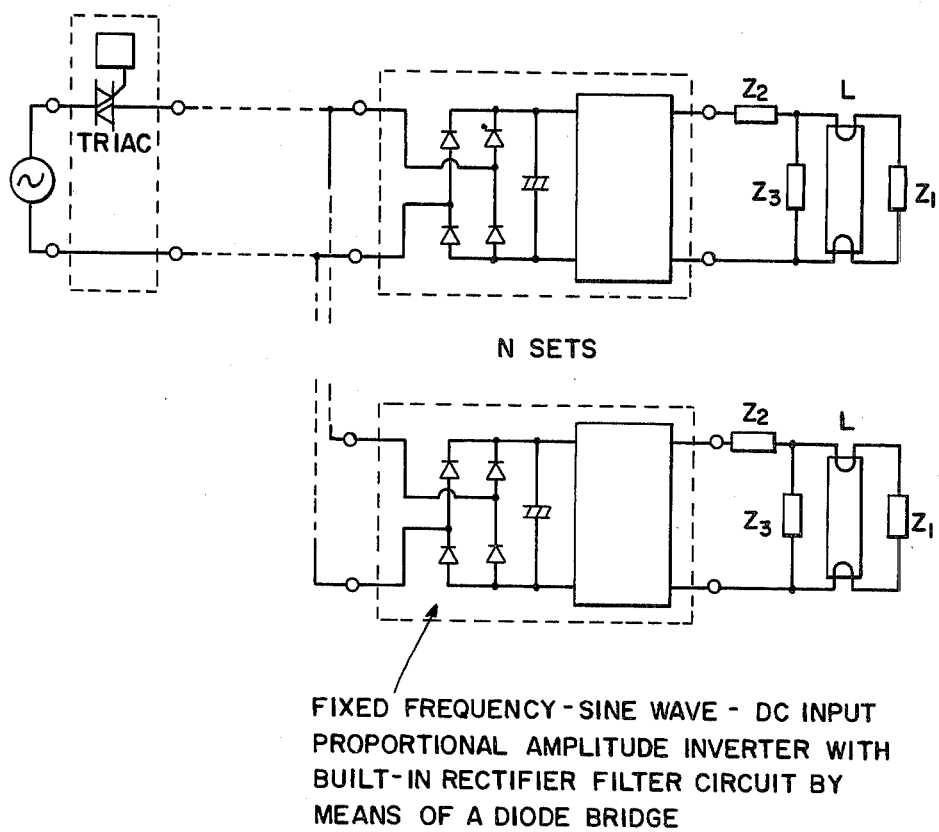
FIG. 18 and FIG. 19 respectively show the construction of common light control devices for high frequency lighted fluorescent lamp.
Figure 19:
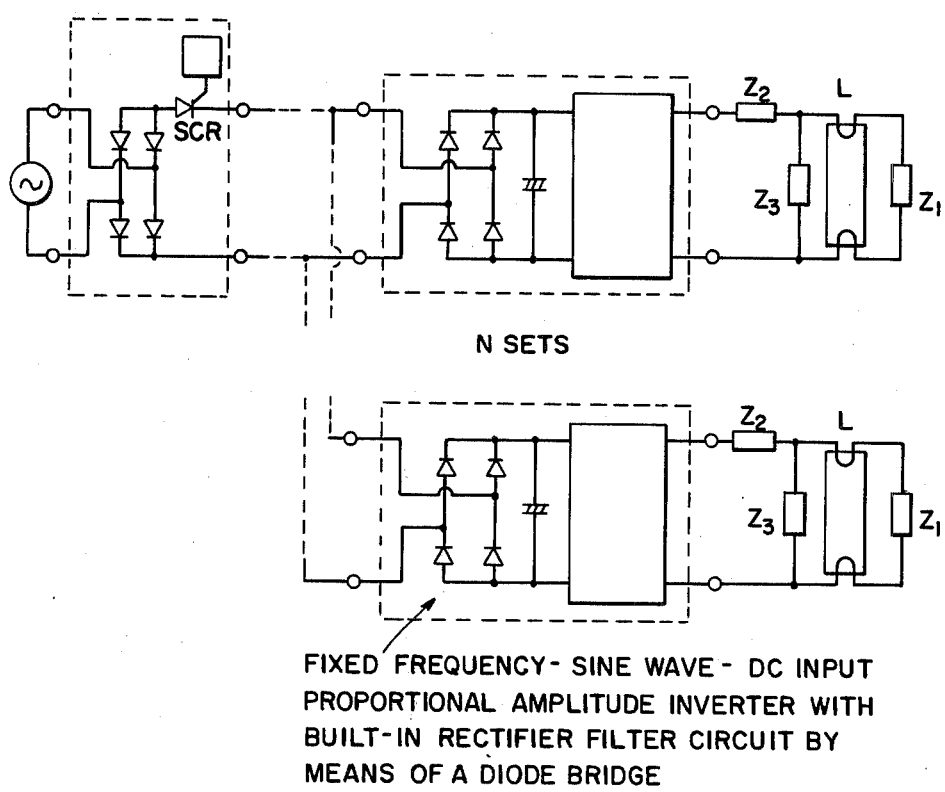

Common light control for a plurality of fluorescent lamp lighting appliances such as in indirect lighting is made possible by connecting fixed frequency - sine wave - DC input proportional amplitude inverters and the lighting circuits in parallel to the AC-DC converters shown in FIG. 14 and FIG. 15. Use of the converter employing a triac as shown in FIG. 14 provides a collective light control device for fluorescent lamps in 2-line system load wiring through a non-polarity connection by adapting it to a plurality of fixed frequency - sine wave -DC input proportional amplitude inverters and lighting circuits, each having a built-in rectifier and filter circuit composed of a diode bridge as shown in FIG. 18, whereby the structure can be made as compact as that of the light control device for an incandescent lamp, since the lighting device contains no smoothing capacitor. Use of the converter employing an SCR as shown in FIG. 15 also enables the non-polarity connection by the provision of a diode bridge on the input of each inverter as shown in FIG. 19. Since all of the load connections are to a 2-line system and in non-polarity, and since the light control device per se functions, in a sense, as a control device for the angle of conduction by way of the thyristor, a simple and convenient collective light control system for fluorescent lamps can be realized as in the collective light control for incandescent lamps. The voltage chopped by the thyristor is applied to the serial circuit composed of the inductor ballast and the fluorescent lamp in the conventional light control device for a fluorescent lamp using commercial frequency and, therefore, significant radio wave interference results from the transient phenomena caused thereby. Such radio wave interference is much reduced, however, in this invention, since a variable sine wave input voltage is applied for the light control; and the present invention is suited as the light control device for domestic use.

Figure 20:
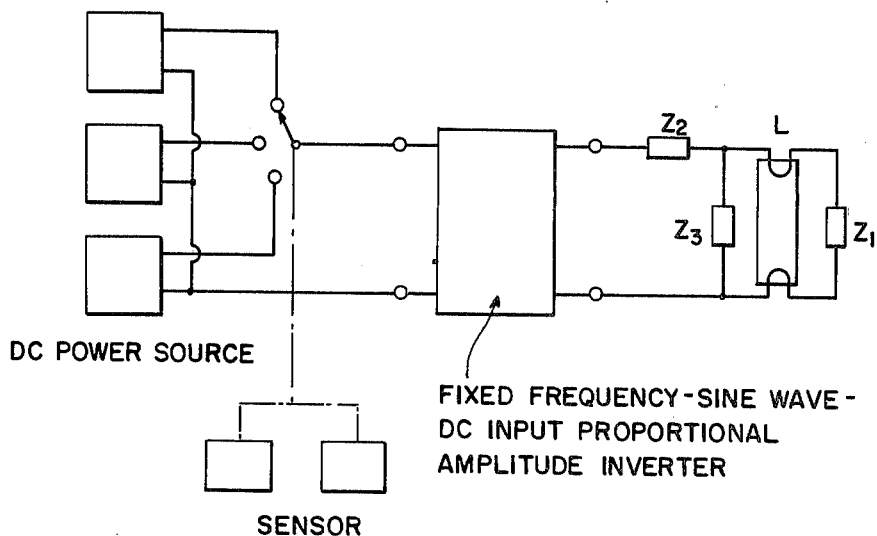
FIG. 20 shows a construction of a light control device for a high frequency lighted fluorescent lamp as an emergency lamp.
Figure 21:
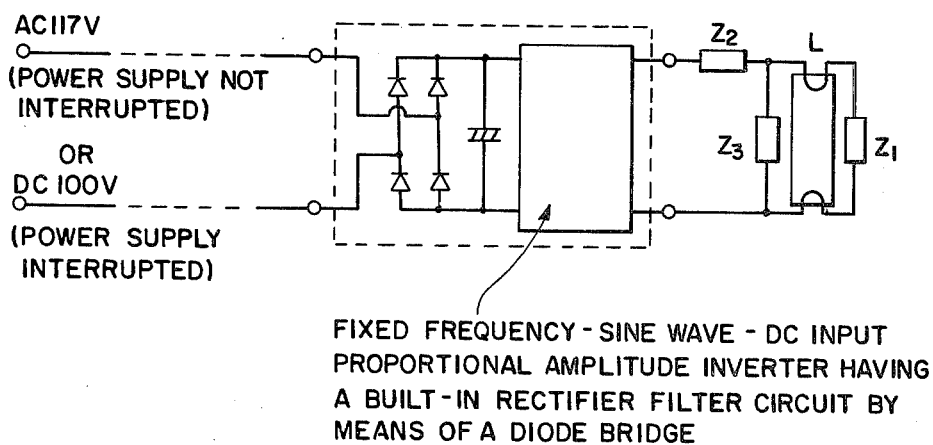
FIG. 21 shows another embodiment having a separated power source.
Figure 22:
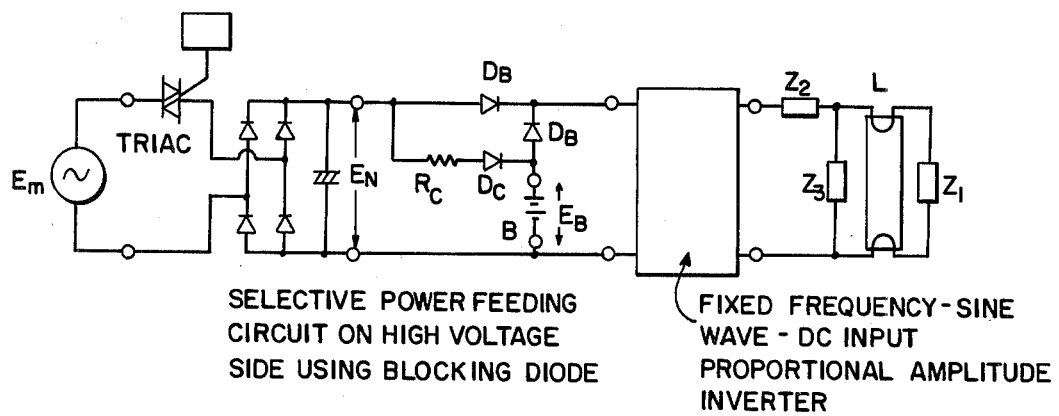
FIG. 22 is a still another embodiment having a built-in power source.

The light control device for a high frequency lighted fluorescent lamp according to the present invention can be operated also as an emergency lamp by assembling a high frequency variable voltage power source with a plurality of sensor-controlled (switched)DC power sources, for example, power sources obtained by rectifying and filtering a commercial power source and charging a secondary battery, and a fixed frequency - sine wave - DC input proportional amplitude inverter. Since the above control device has a high reliability resulting in less radio wave interference inherently domestic use, provides a rapid starting function by means of current source driving for use with a pre-heating start type fluorescent lamp and a light control function, and has an improved lamp life, an excellent emergency lighting device can be obtained by properly choosing the various constants so that operational efficiency at the battery-powered operation can be increased. FIG. 21 shows a construction of a power source-separated type device, in which a non-polarity connection is possible by means of an inverter-built-in diode bridge. In the above embodiment, the luminous flux at the interruption of the power supply is reduced to about 60% of that at the non-interruption condition where AC 117 V is supplied at normal state, and DC 100 V is supplied at interrupted state since $100/\sqrt{2}\times 117\simeq 0.61$. FIG. 22 shows a construction of a built-in battery type emergency lamp wherein a predetermined DC voltage $E_N$ rectified from a commercial power source through an AC-DC converter shown in FIG. 14 and a battery voltage $E_B$ from a secondary battery B floating-charged through a floating charge diode Dc and a floating charge resistor Rc are respectively applied to a fixed frequency - sine wave - DC input proportional amplitude inverter by way of a blocking diode $D_B$. Since the luminous outputs at the non-power interruption state is greater than that at the power interruption state, a distinct relation: $E_N>E_B$ is established between the rectified output voltage $E_N$ from the commercial power source and the secondary battery voltage $E_B$ respectively in proportion to the luminous outputs. $E_N$ and $E_B$ are respectively fed through the blocking diode. Only $E_n$ is applied during the non-interruption state, and only $E_B$ is fed in the interruption state. This means that a superimposing operation is prevented by the insertion of the blocking diode $D_B$ as a non-linear element, but a selective power supply on the high voltage side corresponding to the function of the sensor, i.e., a changeover, switch shown in FIG. 20 is conducted merely by two diodes. The arrangement shown in FIG. 22 is of course used also as a power source-separated type emergency lamp wherein the load wiring can be non-polarized by the provision of a diode bridge to the input of each inverter.

What is claimed is:

1. A light control device for a high frequency lighted fluorescent lamp, comprising: a high frequency variable voltage power source, a first impedance element provided on both terminals of a fluorescent lamp on the side opposite to said power source, a constant power source circuit which supplies, upon starting of the lamp, a constant power to said first impedance element to thereby apply substantially constant cathode pre-heating current and starting voltage and applies, during lighting of the lamp, substantially constant cathode heating current by the lamp voltage, and capable of pre-set light control.

2. The light control device for high frequency lighted fluorescent lamp as defined in claim 1, wherein the constant power source circuit comprises a high frequency variable voltage power source, a second impedance element connected between said power source and the terminals of the fluorescent lamp on the power source side, the fluorescent lamp and the first impedance element.

3. The light control device for high frequency lighted fluorescent lamp as defined in claim 1, wherein the constant power source circuit comprises a high frequency variable voltage power source, a second impedance connected between said power source and the terminals of the fluorescent lamp on the power source side, a third impedance element connected in series with the power source side terminals of the fluorescent lamp, the fluorescent lamp and the first impedance element.

4. The light control device for high frequency lighted fluorescent lamp as defined in claim 3, wherein the first impedance element is a serial circuit composed of a first coil and a first capacitor, the second impedance element is a second coil provided in a magnetic path in common to said first coil and the third impedance is a second capacitor.

5. The light control device for high frequency lighted fluorescent lamp as defined in claim 2, wherein the first impedance element is a circuit consisting of a serial circuit composed of a first coil and a first capacitor and a second capacitor further connected in parallel therewith.

6. The light control device for high frequency lighted fluorescent lamp as defined in claim 3, comprising a pair of fluorescent lamps, which operate in a sequential manner and wherein the first impedance element comprises two sets of serial circuits, each provided between said terminals of a respective lamp on the side opposite to said power source, and each composed of a first coil and a first capacitor, and the second impedance element is a second coil provided in a magnetic path in common to said first coils and the third impedance element is composed of two sets of second capacitors, each connected across a respective one of said series circuits.

7. The light control device for high frequency lighted fluorescent lamp as defined in claim 2, comprising a pair of fluorescent lamps which operate in a sequential manner and, wherein the first impedance element is two sets of circuits, each provided between said terminals of a respective lamp on the side opposite to said power source, and each consisting of a serial circuit composed of a first coil and a first capacitor and a second capacitor further connected in parallel therewith, and the second impedance element is a second coil provided in a magnetic path in common to the first coils.

8. The light control device for high frequency lighted fluorescent lamp as defined in claim 1, wherein the high frequency variable voltage power source comprises a variable output AC-DC converter and a fixed frequency - sine wave - input proportional amplitude inverter.

9. The light control device for high frequency lighted fluorescent lamp as defined in claim 1, wherein the high frequency variable voltage power source comprises a circuit for the direct rectification and filtration of a commercial power source and a fixed frequency - sine wave - variable output inverter.

10. A variable output AC-DC converter for use with the light control device for high frequency lighted fluorescent lamp as defined in claim 8, which is adapted to conduct only in the range of the phase angle between $\pi/2-\pi$ of the power source voltage in which the angle of conduction is set small enough as compared with $2\pi$ and the conduction phase is rendered variable to thereby substantially equalize the terminal voltage of a smoothing capacitor to the instantaneous value of the power source voltage in the conduction phase.

11. A collective light control device for high frequency lighted fluorescent lamp as defined in claim 8, capable of load wiring in a 2-line system of non-polarity connection wherein the outputs from a control circuit adapted to conduct only in the range of the phase angle between $\pi/2-\pi$ of the power source voltage and the conduction phase of which is rendered variable, are supplied respectively to individual fixed frequency - sine wave - DC input proportional amplitude inverters each having a built-in rectification and filtration circuit using a diode bridge.

12. The light control device for high frequency lighted fluorescent lamp as defined in claim 1, wherein the high frequency variable voltage power source comprises variable output (output-switchable) DC sources controlled by a sensor and a fixed frequency - sine wave - input proportional amplitude inverter, and having a function of an emergency lamp.

13. The light control device for high frequency lighted fluorescent lamp as defined in claim 12, which is adapted to perform a selective power feeding on the high voltage side by supplying a power to a fixed frequency - sine wave - input proportional amplitude inverter from two sets of DC power sources of different voltages respectively by way of a blocking diode.

* * * * *